(12) United States Patent
Glenn (10) Patent No.: US 11,255,775 B2
(45) Date of Patent: Feb. 22, 2022

(54) METHOD OF SINGLE PULSE DETECTION OF THE REAL AND IMAGINARY COMPONENTS OF THE NONLINEAR SUSCEPTIBILITY TO DETECT MOLECULAR DYNAMICS VIA THE GEOMETRIC PHASE EFFECT

(71) Applicant: Rachel Glenn, Fort Worth, TX (US)

(72) Inventor: Rachel Glenn, Fort Worth, TX (US)

( * ) Notice: Subject to any disclaimer, the term of this patent is extended or adjusted under 35 U.S.C. 154(b) by 0 days.

(21) Appl. No.: 16/449,768

(22) Filed: Jun. 24, 2019

(65) Prior Publication Data

US 2020/0003681 A1 Jan. 2, 2020

Related U.S. Application Data

(60) Provisional application No. 62/690,761, filed on Jun. 27, 2018.

(51) Int. Cl.
*G01N 21/31* (2006.01)
*G01N 21/64* (2006.01)

(52) U.S. Cl.
CPC ......... *G01N 21/3103* (2013.01); *G01N 21/64* (2013.01)

(58) Field of Classification Search
CPC .................. G01N 21/3103; G01N 21/64
See application file for complete search history.

(56) References Cited

U.S. PATENT DOCUMENTS

| | | | | |
|---|---|---|---|---|
| 2009/0207470 A1* | 8/2009 | Vance | ............ | G02F 1/3526 359/241 |
| 2009/0256071 A1* | 10/2009 | Dantus | ............ | H01J 49/162 250/282 |
| 2016/0123807 A1* | 5/2016 | Vance | ............ | G02B 27/288 356/365 |

OTHER PUBLICATIONS

Evans et al. "Coherent anti-Stokes Raman scattering spectral inteferometry: determination of the real and imaginary components of nonlinear susceptibility X(3) for vibrational microscopy," Optics Letters, vol. 29, No. 24, pp. 2923-2925; Dec. 15, 2004. (Year: 2004).*

(Continued)

*Primary Examiner* — David P Porta
*Assistant Examiner* — Fani Boosalis
(74) *Attorney, Agent, or Firm* — Law Office of Jeff Williams PLLC; J. Oliver Williams (57) ABSTRACT

A method of detecting a geometrical phase change of an intrinsic property of a molecular isomerization includes a series of steps, such as simulating molecular isomerization of the molecule through application of a single shaped pulse to generate a molecular polarization. The steps include separating the real and imaginary parts of a nonlinear susceptibility in a detected molecular signal by controlling a phase of a reference field. The steps include assigning a phase function to obtain separation of the real and imaginary parts. Furthermore, a broadened vibrational lineshape is calculated. The step of identifying conical intersections also occurs. Various pathways of a wave packet in an excited state potential energy surface is discussed and may include multiple laser pulses and methods of detection. The spectral phase may be used to create interference of the wave packet in the excited state to identify and control a wavepacket's pathway and control photoisomerization.

20 Claims, 7 Drawing Sheets

(56) References Cited

OTHER PUBLICATIONS

Xu et al. "Heterodyne detected transient grating spectroscopy in resonant and non-resonant systems using a simplified diffractive optics method," Chemical Physical Letters 338 (2001), p. 254-262. (Year: 2001).*

* cited by examiner

METHOD OF SINGLE PULSE DETECTION OF THE REAL AND IMAGINARY COMPONENTS OF THE NONLINEAR SUSCEPTIBILITY TO DETECT MOLECULAR DYNAMICS VIA THE GEOMETRIC PHASE EFFECT

CLAIM OF PRIORITY

This application claims the benefit of U.S. Provisional Application No. 62/690,761, filed 27 Jun. 2018. The information contained therein is hereby incorporated by reference.

BACKGROUND

1. Field of the Invention

The present application relates to molecular dynamics, and more particularly to a method of using a single pulse to measure both the real and imaginary parts of nonlinear signals in the real part of the susceptibility.

2. Description of Related Art

The molecular response is complex, in that, it has both a dispersive (real) and absorptive (imaginary) contribution. Over the course of time, molecular optics has been very fruitful in developing theories based off of experimental observations of the molecular absorption. The dispersion spectrum appears to be less interesting than the absorption spectrum, since there are few studies related the dispersion. The concept of the absorption and dispersion being separately observable, leads one to ask: is it possible for the real part of the susceptibility to be mixed into the molecular absorption signal in the regime of weak electric fields? This would enable one to use a single pulse to measure both the real and imaginary parts of the nonlinear signal; thereby simplifying experimental setup drastically. Although strides have been made in this area of study, shortcomings remain.

SUMMARY OF THE INVENTION

The real and imaginary parts of the susceptibility are fundamentally associated with the molecular dispersion and absorption, respectively. It will be shown that when using a single shaped pulse, it is possible to mix the real and imaginary parts of the non-linear susceptibility into the molecular absorption. Measurements of the molecular dispersion with unshaped pulses have given insight into underlying molecular dynamics such as the identification of conical intersections with solvated molecules. Conical intersections occur when a molecule absorbs light and then twists to release energy to go to a lower state of energy. The molecule starts in one geometric conformation and twists to another/same geometric conformation. The ability to identify a conical intersection is vital to understand how to control a single or multiple bonds in a molecule. Controlling a single or multiple bond conformations in molecule is important for controlling a chemical reaction. We developed a methodology to separate the real and imaginary parts of the third-order nonlinear susceptibility with a single pulse. We relate this methodology to previous methodologies of using multiple pulses to detect the real and imaginary parts of the nonlinear signal for identifying conical intersections.

It is an object of the present application to further the conceptual understanding of the absorption/dispersion spectra to identify a solvated molecular conical intersection with the absorption of light. We include an asymmetrically broadened lineshape to model a single solvated molecule. Inhomogenous broadening is included to model a collection of solvated molecules. A geometric phase is used to model the conical intersection of a twisting molecule.

Figure 1:
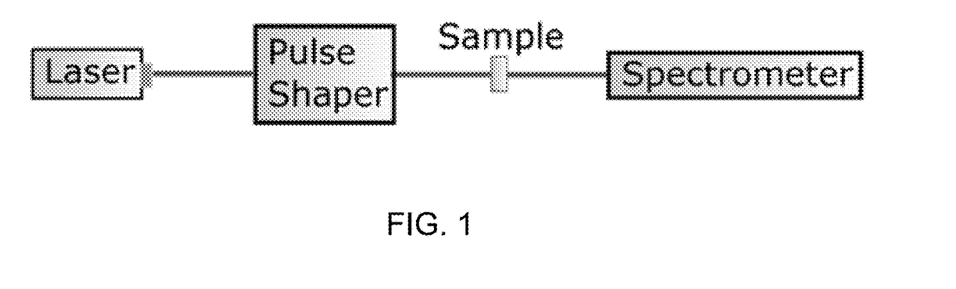
FIG. 1 is an illustration of the experimental setup in accordance with the method of the present application to detect the real and imaginary parts of a molecular signal.

Furthermore, it is explained how to measure the real and imaginary parts of the third-order susceptibility in the heterodyne detected signal with a single shaped pulse. The experimental setup is shown in FIG. 1. We also connect our methodology to previous with how to identify a conical intersection through either the geometric phase effect or multiple pulses.

Ultimately the invention may take many different methods. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one method of the present invention in detail, it is to be understood that the methods are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for pursuits in other areas while carrying out the various purposes of the present method. It is important, therefore, that the claims be regarded as including such equivalent steps insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative steps of the preferred method are described below. In the interest of clarity, not all features of an actual implementation are described in this specification. It will of course be appreciated that in the development of any such actual method, numerous implementation-specific decisions must be made to achieve specific goals, such as compliance with various constraints, which may vary from one implementation to another. Moreover, it will be appreciated that such a development effort might be complex and time-consuming but would nevertheless be a routine undertaking for those of ordinary skill in the art having the benefit of this disclosure.

The separation of the real and imaginary parts of the susceptibility has been employed with multiple pulses to understand molecular dynamics such as thermal solvent expansion, non-resonant solvent contributions, such as the optical Kerr effect, and changes in excited-state population. The key to separating the real and imaginary parts of the susceptibility $\chi(\omega)$ has been to control the phase $\varphi(\omega)$ of a reference field $$E(\omega)=A(\omega)M(\omega), \quad (1)$$

where $$M(\omega)=e^{i\phi(\omega)}, \quad (2)$$

and $A(\omega)$ is the envelope of the field. The measured signal is a product of the field and polarization $P(\omega) \alpha \chi(\omega)$ $$S_{\pm\phi}(\omega) = |E_{\pm\phi}(\omega) + iP_{\pm\phi}(\omega)|^2 \approx |A(\omega)|^2 + \quad (3)$$
$$A(\omega) \times (\text{Re}[M_{\pm\phi}(\omega)]\text{Im}[P_{\pm\phi}(\omega)] + \text{Im}[M_{\pm\phi}(\omega)]\text{Re}[P_{\pm\phi}(\omega)]),$$

where the subscript $\pm\phi$ is used to specify what type of phase is associated with each parameter, i.e., $E_{\pm\phi}(\omega)=A(\omega)$ $M_{\pm\phi}(\omega)$ and $P_{\pm\phi}(\omega)$ is expanded as a power series in $E_{\pm\phi}(\omega)$. We will replace $\pm\phi$ with either $\pm\pi$, $$\pm\frac{\pi}{2},$$

or TL to specify me phase function as a $\pm\pi$-phase-step, $$\pm\frac{\pi}{2}$$

phase-step, or transform limited (TL-no phase and a pulsed laser beam), respectively. By controlling the phase of the local oscillator to be in phase [$\phi(\omega)=0$] or quadrature $$\left[\phi(\omega) = \frac{\pi}{2}\right],$$

the separation of Im[P(ω)] or Re[P(ω)] can be obtained. For solvated molecules, the solvent is chosen to be off-resonant with a fairly constant absorption spectrum near the solute absorption peaks. This would suggest that the solute and solvent response do not interact. However, it was shown that the solute and solvent response do interact. Their interaction resulted in different decay profiles for the measured nonlinear absorption and dispersion. The real part of the solute changed sign from positive in the blue to negative in the red portion of the spectrum; whereas, the solvent response remained constant and positive. When the solvent and solute were mixed, the dispersion decay profile was shortened in the red portion of the spectrum and elongated in the blue part of the spectrum. Here we employ an asymmetrically broadened lineshape to model a single solvated molecule. We include in-homogenous broadening to describe the detected signal from a collection of solvated molecules.

Separation of the real and imaginary parts of the signal (hence susceptibility) with multiple pulses assisted with identifying the presence of a non-radiative decay pathway through a conical intersection. The non-radiative decay of the wave packet through a conical intersection was to a hot ground state or product state. For different central frequencies of the exciting pulse, each detected signal had different molecular relaxation rates. Molecules with a fast non-radiative decay, from the excited state to a hot ground-state, have a shift in the ground-state absorption maximum. In turn, this shifts the electronic absorption maximum. Detection of a shift in the absorption maximum was done by separating the real and imaginary parts of the spectrum. The real-part (where it crosses from positive to negative) was used to identify the peak in the absorption maximum. Note that the real-part of the molecular spectrum changes sign due to a π-phase change occurring at the absorption maximum. A conical intersection also has a phase change associated with the geometric phase change at the conical intersection, which can be used to identify a conical intersection Prior methodology included the homodyne detected signal and real and imaginary parts of the heterodyne detected signal to identify a conical intersection. Prior efforts also involved developing a theory for using a single shaped pulse, measuring the homodyne signal, to detect conical intersections. However, here we complement that modality by explaining how to measure the real and imaginary parts of the third-order susceptibility in the heterodyne detected signal with a single shaped pulsed. We also connect our methodology to previous with how to identify a conical intersection.

We use the double sided Feynman diagrams to simulate the absorption. The Feynman diagrams previously have been utilized to simulate experimental measurements with identifying a conical intersection with solvated molecules and a multi-pulse setup. Other more advanced methods include the nuclear degrees of freedom and are too computationally expensive to be modified to include both the real and imagery components of the electric field.

The type of spectral phase function that we employ in this application is a sharp phase-step. A sharp spectral phase has been shown that it can resonantly excite a particular vibrational mode in coherent anti-Stokes Raman scattering (CARS) spectroscopy. When the transition of the $\pm\pi$-step coincides with the vibrational resonance, it excites that particular vibrational line. The phase-step creates a sharp change in the electric field at the phase-step transition frequency $\omega_s$, creating an instantaneous field change from a positive (negative) to negative (positive) value. This impulse when corresponding to an electronic vibrational frequency changes the phase of that particular line and its' inhomogeneous line shape. We show that both the linear and nonlinear polarization line shape will be affected by the phase of the pulse.

In Section I, explanation will be given for how to separate the real and imaginary parts of the susceptibility in a heterodyne detected signal for a single shaped pulse. In Sect. II, we calculate the inhomogeneously broadened vibrational lineshape with a resonant phase. We provide simulations of the molecular absorption spectrum in Sect. III. In Section IV, we provide simulations as to how our modality connects to previous modalities. In Section V, we describe the applications of this method. Concluding remarks are given in Section VI.

I. THE COMPLEX SUSCEPTIBILITY IN THE HETERODYNE DETECTED ABSORPTION SIGNAL WITH A SHAPED PULSE

Molecular absorption and dispersion is previous described from the relationship between the permittivity, polarization, and susceptibility. Typically one assumes a continuous wave laser. Here we explain how a shaped pulse(s) modifies the previous description of dispersion and absorption. The heterodyne detected signal is given in Eq. 3. The polarization is defined as $P_{\pm\phi}(\omega)=P_{\pm\phi}^{(1)}(\omega)+P_{\pm\phi}^{(3)}(\omega)$, where $P_{\pm\phi}^{(1)}(\omega)$ is the first-order polarization and we do not consider the second-order polarization, since it vanishes for centrosymmetric molecules. The first-order polarization is directly related to the linear susceptibility $\chi^{(1)}(\omega)$ as $$P_{\pm\phi}^{(1)}(\omega)=E_{\pm\phi}(\omega)\chi^{(1)}(\omega). \quad (4)$$

The third-order polarization is related to the third-order susceptibility $\chi^{(3)}(\omega)$ as $$P_{\pm\phi}^{(3)}(\omega)=\int d\omega_1 d\omega_2 E_{\pm\phi}(\omega_1)E_{\pm\phi}^*(\omega_2)\times E_{\pm\phi}(\omega-\omega_1+\omega_2)\chi^{(3)}(\omega;\omega_1,\omega_2). \quad (5)$$

The permittivity $\varepsilon(\omega)$ is commonly defined using a continuous wave laser(s) $\vec{E}=E_0 e^{i k\vec{x}-\omega_L t}\hat{E}$, where $E_0$ is the amplitude of the electric field, $\omega_L$ the frequency of the applied field, and k the wavenumber. From the relation $\vec{D}=\varepsilon_0 \vec{E}+\vec{P}=\varepsilon_0\varepsilon(\omega)\vec{E}$, it is given as $$\varepsilon(\omega)=1+\chi^{(1)}(\omega)+\chi^{(3)}(\omega)|\vec{E}|^2, \quad (6)$$

Where $\mathrm{Re}[\varepsilon(\omega)]$ represents the dispersion and $\mathrm{Im}[\varepsilon(\omega)]$ represents the absorption. The description of absorption is defined as $\propto\mathrm{Im}[\chi^{(1)}(\omega)]$ and $\propto\mathrm{Im}[\chi^{(3)}(\omega)]$. Similarly, the description of the dispersion is defined as $\propto\mathrm{Im}[\chi^{(1)}(\omega)]$ and $\propto\mathrm{Im}[\chi^{(3)}(\omega)]$. If a Gaussian TL pulse(s) is used to measure the molecular signal, the integration in Eq. 5 cannot be done analytically and the factorization of the electric field leading to the relation $\varepsilon(\omega) \propto \chi^{(3)}(\omega)|\vec{E}|^2$ does not occur. However, the Gaussian TL pulse has a frequency independent phase and what is measured is the integration of the envelope of the field with the third-order susceptibility. For a large envelope that is fairly constant within the molecular absorption range, the relation $\varepsilon(\omega) \propto \chi^{(3)}(\omega)|\vec{E}|^2$ holds approximately.

When a shaped pulse is used to generate the molecular polarization, the electric field in the integrand of Eq. 5 has both a real and imaginary contribution that multiplies the complex susceptibility. The nonlinear contribution to the signal, detected in the forward direction, can be described as $$Im[E_{\pm\phi}^*(\omega)P_{\pm\phi}^{(3)}(\omega)]=A(\omega)Im[\int d\omega_1 d\omega_2 A(\omega_1)A^*(\omega_2)\\A(\omega-\omega_1+\omega_2)\times\{\Phi_1^{\pm\phi}(\omega,\omega_1,\omega_2)+i\phi_2^{\pm\phi}(\omega,\omega_1,\omega_2)\}\chi^{(3)}(\omega;\omega_1,\omega_2)]. \quad (7)$$

Where we separated $M_{\pm\phi}(\omega)M_{\pm\phi}(\omega_1)M_{\pm\phi}(\omega_2)M_{\pm\phi}(\omega-\omega_1+\omega_2)$ into real and imaginary components $\Phi_1^{\pm\phi}(\omega,\omega_1,\omega_2)$ and $\Phi_2^{\pm\phi}(\omega,\omega_1,\omega_2)$, which are given in the Appendix A. The superscript $\phi$ represents the type of phase the functions $\Phi_1^{\pm\phi}$ and $\Phi_2^{\pm\phi}$ have. As described earlier, we will replace $\pm\phi$ with either $\pm\pi$ or $$\pm\frac{\pi}{2}$$

to represent a $\pm\pi$ if or $$\pm\frac{\pi}{2}$$

phase-step, respectively. The complex field mixes the real and imaginary parts of the susceptibility, into the real and imaginary parts of the permittivity. This raises the question of how to separate the real and imaginary components of the susceptibility, when using a shaped pulse. The separation of the two components of the susceptibility can be accomplished by utilizing the spectral phase of the pulse. Our objective is to understand how a shaped pulse affects the absorption, so any contributions that are not sensitive to the phase will be subtracted off. This can easily be done by measuring the molecular signal detected in the forward direction with a single shaped pulse. Afterwards, measuring the same molecular signal with a TL pulse, then subtracting the two, giving $$S_{TL}(\omega)-S_\phi(\omega)\approx A(\omega)\{Im[P_{TL}(\omega)]-Re[M_\phi(\omega)]Im[P_\phi(\omega)]-Im[M_\phi(\omega)]Re[P_\phi(\omega)]\}, \quad (8)$$

where the subscript $\phi$ (TL) represents the polarization measured with a particular phase (constant phase). When $Re[M_\phi(\omega)]=1$ and $Im[M_\phi(\omega)]=0$, Eq. 8 is zero. When $Im[M_\phi(\omega)]\neq 0$ and $Re[M_\phi(\omega)]\neq 0$, Eq. 8 contains terms proportional to both the real and imaginary parts of $\chi^{(3)}$. When $Im[M_\phi(\omega)]=0$ and $Re[M_\phi(\omega)]\neq 0$, Eq. 8 becomes $$S_{TL}(\omega)-S_\phi(\omega)\approx A(\omega)\int d\omega_1 d\omega_2 A(\omega_1)A^*(\omega_2)\times A(\omega-\omega_1+\omega_2)\{1-\Phi_1^\phi(\omega,\omega_1,\omega_2)\}\times Im[\chi^{(3)}(\omega;\omega_1,\omega_2)]. \quad (9)$$

Equation 9 represents the change in the absorption spectrum due to a completely real applied spectral phase, which is proportional to the imaginary part of the susceptibility. Another way to measure the imaginary part of the susceptibility is by changing the sign of the applied complex phase. The imaginary part is given by the following relation $$S_{TL}(\omega) - \tfrac{1}{2}(S_\phi(\omega) + S_{-\phi}(\omega)) \approx A(\omega) \int d\omega_1 d\omega_2 \times A(\omega_1) A^*(\omega_2) A(\omega - \omega_1 + \omega_2) \{1 - \Phi_1^\phi(\omega, \omega_1, \omega_2)\} \times Im[\chi^{(3)}(\omega; \omega_1, \omega_2)]. \quad (10)$$

The real part of the susceptibility can be found by subtracting $S_\phi$ and $S_{-\phi}$ giving $$S_{-\phi}(\omega) - S_{+\phi}(\omega) \approx A(\omega) \int d\omega_1 d\omega_2 \times A(\omega_1) A^*(\omega_2) A(\omega - \omega_1 + \omega_2) \Phi_2^\phi(\omega, \omega_1, \omega_2) \times Re[\chi^{(3)}(\omega; \omega_1, \omega_2)]. \quad (11)$$

Equations 9-11 describe how to separate out the real and imaginary components of the susceptibility. In the derivation of Eqs. 9-11, we assumed a non-Kerr-like media and observed both the real and imaginary parts of the nonlinear susceptibility in the nonlinear absorption. For Kerr-like media, mixing of the real and imaginary parts of the nonlinear susceptibility in the nonlinear absorption and dispersion can occur when using TL pulses.

The linear signal $S_\phi(\omega) \propto E_\phi^\dagger(\omega) E_\phi(\omega) \chi^{(1)}(\omega)$ is insensitive to any spectral phase added to the field and cancels in Eqs. 9-11. However, $P(\omega) = E_\phi(\omega) \chi^{(1)}(\omega)$ should be inhomogenously broadened for solvated molecules. Typically the phase does not influence an inhomogenously broadened absorption lineshape. When the phase is in resonance with a particular vibrational line, it changes the phase of that particular vibrational line and thus influences the absorption lineshape. When the phase relationship between the driving electric field oscillation either enhances the absorption (in-phase) or dispersion (or out-of-phase), then the electric field phase is in-resonance or out-of-resonance with a molecular vibrational resonance. In the next section, we show how the phase of the electric field influences the absorption lineshape and leads to a non-zero contribution of $\chi^{(1)}(\omega)$ to the detected signals Eqs. 9-11.

II. THE MOLECULAR LINESHAPE WITH A RESONANTLY APPLIED ELECTRIC PHASE

The influence of the phase of the electric field on the lineshape is most pronounced when the phase-step position coincides with a vibrational mode. Previous studies considered the phase-step with a sharp transition, such as the Heaviside Theta function, rectangular function, or signum function that has no transition width. It has also been considered a function with a continuous transition width, such as the arctangent, error function, or Lorentizian function. Here we approximate the arctangent function with the assumption of a sharp transition. When using a sharp $\pm\pi$-step, the imaginary part of the phase contains a sharp Lorentzian. When the width of the Lorentzian is smaller than the pulse-shaper resolution, it can be safely neglected, making the $\pm\pi$-shaped pulse a completely real electric field, which is given as $$M_{\pm\pi}(\omega) = \quad (12)$$

$$\cos\left[\frac{\pi}{2} - \arctan(\omega - \omega_s)\tau_s\right] \pm i\sin[\pi/2 - \arctan[(\omega - \omega_s)\tau_s]]$$

$$M_{\pm\pi}(\omega) \approx \frac{(\omega - \omega_s)\tau_s}{\sqrt{(\omega - \omega_s)^2 \tau_s^2 + 1}}$$

for a $\pm\pi$ spectral phase.

$$M_{\pm\frac{\pi}{2}}(\omega) = \quad (13)$$

$$\cos\left[\frac{1}{2}(\pi - \arctan(\omega - \omega_s)\tau_s)\right] \pm i\sin[1/2(\pi - \arctan[(\omega - \omega_s)\tau_s]]$$

$$M_{\pm\frac{\pi}{2}}(\omega) \approx \frac{1}{\sqrt{2}}\left(\frac{(\omega - \omega_s)\tau_s}{\sqrt{(\omega - \omega_s)^2\tau_s^2 + 1}} + i\right)$$

for a $$\pm\frac{\pi}{2}$$

spectral phase. In Eqs. 12 and 13 we used the asymptotic limit x»1 for the arctan(x) to derive the final expression. It turns out that this expression satisfies the condition x«1. Note that we added a constant phase to function $\pm\phi$ to make the analytical solution possible. This has no effect on the detected signal.

The phase of the electric field at the phase-step position is in-(out-of) resonance with an electronic vibrational frequency when $\omega_s = \omega_k$, where $\omega_k = (\varepsilon_k - \varepsilon_g)/\hbar$. The lineshape of an inhomogeneous broadened molecular Pa) with a resonant phase-step transition is given by $$\langle P_{s=k}^{(1)}(\omega) \rangle = \int d\omega_k G(\omega_k) E_{\pm\phi}(\omega) \chi_k^{(1)}(\omega) \quad (14)$$

$$= |\mu_k|^2 A(\omega) Q_k^{\pm\phi}(\omega, \omega),$$

where the inhomogeneous broadening function $Q_k^{\pm\phi}$ is given by $$Q_k^{\pm\phi}(\omega_a, \omega_b) = \frac{-1}{2\pi\hbar} \int d\omega_k \frac{\mathcal{G}(\omega_k) M_{\pm\phi}(\omega_a; \omega_k)}{\omega_b - \omega_k + i\gamma_k}. \quad (15)$$

Figure 2:
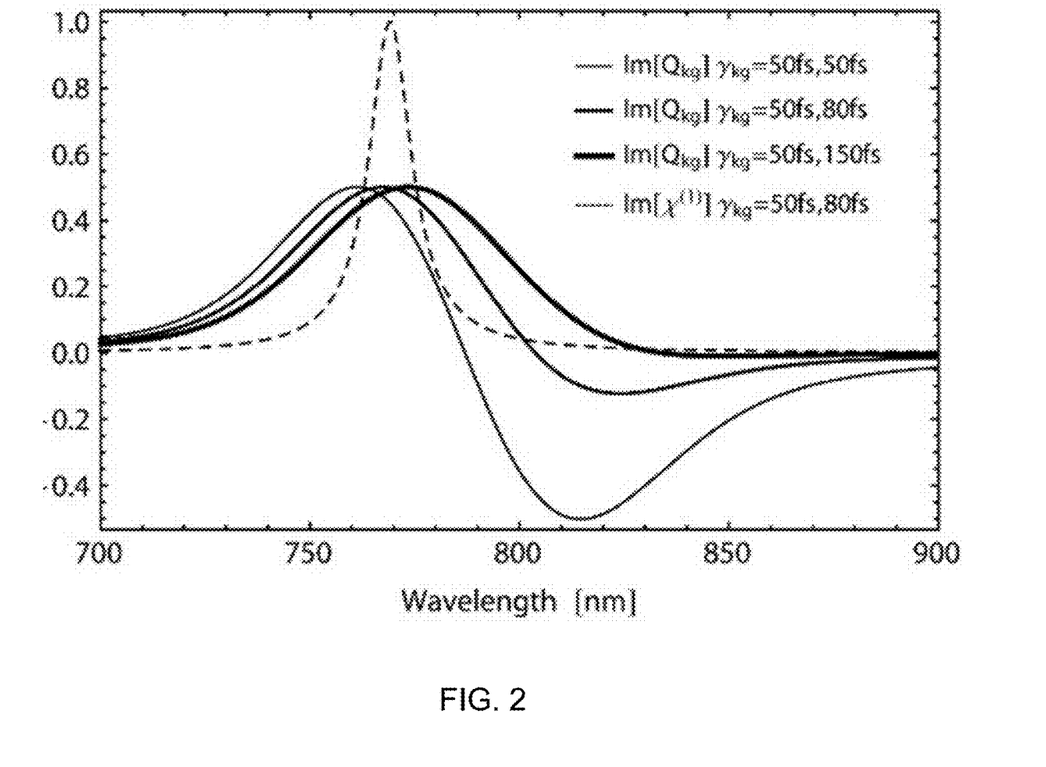
FIG. 2 is a graph showing how to change an absorption lineshape to a dispersion lineshape at different widths with a phase-step.

The inhomogenous broadening function $\mathcal{G}(\omega_k)$ is a Gaussian function, defined as $$\langle P_{s\pm k}^{(1)}(\omega) \rangle = \frac{-1}{2\pi\hbar} |\mu_k|^2 A(\omega) M_{\pm\phi}(\omega; \omega_S) \times \int d\omega_k \frac{\mathcal{G}(\omega_k)}{\omega_b - \omega_k + i\gamma_k}. \quad (17)$$

where $\langle \omega_k \rangle$ corresponds to the absorption maximum in the measured electronic linear absorption and the full width half max is $2\sqrt{2\ln(2)}\Delta_k$. For simplicity, in Eq. 14, we dropped the $\pm\phi$ notation on $P^{(1)}(\omega)$. It will enter in later when we define the total $P^{(1)}$ signal. The resonant phase-step changes the phase of the absorption line. In FIG. 2, we plotted $Im[\chi^{(1)}(\omega)]$ with the same decay rate to the red and blue of $\omega_k$ (thin-dashed line). The imaginary part of $Q_k$ is plotted in FIG. 2 (thin-solid line) for the same decay rates to the red and blue of $\omega_k$ with a sharp $\pi$-step (Eq. 12), $\tau_s$=2800 GHz$^{-1}$. The effect of a resonant phase-step changes the absorption-like lineshape to dispersion-like. When asymmetry is taken into account, using $\gamma_k$=1/50 fs to the red and $\gamma_k$=1/80 fs to the blue side of $\omega_k$, the lineshape becomes less dispersive-like. Increasing to $\gamma_k$=1/120 fs on the blue side, the lineshape is absorption-like. The linear absorption signal using Eq. 14 is sensitive to the phase of the pulse. Overall, FIG. 2 demonstrates that spectral phase of the pulse can change an absorption lineshape to a dispersion lineshape. The first-order molecular polarization is sensitive to resonantly applied spectral phase.

The first-order contribution to excite all other vibrational lines ($\omega_s \neq \omega_k$) is given as $$\mathcal{G}(\omega_k) = \exp\left[-\frac{(\omega_k - \langle\omega_k\rangle)^2}{2\Delta_k}\right], \tag{16}$$

The linear polarization generated with a shaped pulse can be considered as a summation of Eqs. 14 and 17

$$\langle P^{(1)}_{\pm\phi}(\omega)\rangle = \frac{1}{2}(\langle P^{(1)}_{s=k}(\omega)\rangle + \langle P^{(1)}_{s\neq k}(\omega)\rangle). \tag{18}$$

The linear polarization generated with TL shaped pulse is given by $$\langle P^{(1)}_{TL}(\omega)\rangle = \langle P^{(1)}_{s\neq k}(\omega)\rangle, \tag{19}$$

with $M(\omega)=1$ in Eq. 17. The inhomogenous broadened third-order polarization with a in-phase (out-of-phase) resonant phase-step will have a similar approach and is given in Appendix B. In the next section, we will simulate the nonlinear heterodyne detected signal with various size phase-step functions: $\pm\pi$-step and $$\pm\frac{\pi}{2}$$

step.

III. SIMULATIONS

The molecular signal is simulated with a single shaped pulse with phase $\pm\pi$, $$+\frac{\pi}{2}, \text{ or } -\frac{\pi}{2}.$$

We assume that the signal is collected in the forward direction, meaning that the molecular signal is mixed with the laser pulse, which was not absorbed. For this reason, we consider the signal as a single pulse heterodyne detected signal.

All simulations were performed by considering a sharp-spectral phase transition, Eqs. 12 and 13. All calculations presented in this section were calculated using a sharp phase-step $\tau_s=2800$ GHz$^{-1}$ and three different phase-step positions $\omega_s$. The laser pulse used was a 13 fs Gaussian pulse, centered at $\lambda_L=794$ nm, which is within the typical range for a Ti-sapphire laser. The inhomogenous broadened function, Eq. 16, had $\langle\lambda_k\rangle=787$ nm and $\Delta_k=0.07$, which could match a molecule such as ICG in low molar concentration in solution. The symmetric Green's function is accounted for by setting $\gamma_k=\gamma_0=1/40$ fs. The asymmetric Green's function was accounted for in Eqs. B3, B5-B13 by using a frequency dependent decay rate in the Green's function $G_k(\omega)$ $$\gamma_k^{\mp}(\omega_k) = 2\frac{\gamma_0}{(1 + 0.4 * e^{\pm(\omega_k - \langle\omega_k\rangle)})}. \tag{20}$$

When $\omega_k < \langle\omega_k\rangle$, we used $\gamma_k^-$. At the absorption maximum, $\omega_k=\langle\omega_k\rangle$ we set $\gamma_k=\gamma_0$. When $\omega_k > \langle\omega_k\rangle$, we used $\gamma_k^+$. The ground state level decay rate was set to 100 fs. We chose the electric field strength as $$E_0 = 2.5 \times 10^9 \frac{V}{m}$$

and dipole moment $\mu=6D$ to give the most interesting results. The integrations were programmed in C++ and modularized into Python using pybind11. The one and three dimensional integration were computed with a non-adaptive integration method by specifying the number of sampling points. We tested the integrations using a combination of non-adaptive and adaptive multi-dimensional quadrature Simpson method. We tried doing the inner integrations using a non-adaptive method and the outer integrations adaptively. We found that the adaptive tolerance was a user chosen control that needed adjustment to ensure enough sampling for the integration to converge correctly. We found this to be difficult when integrating sharp features in a multidimensional integration and resorted to the non-adaptive, slower method, to ensure accurate sampling. The inhomogeneous line-function Eq. 15, appears in some of the multidimensional integrations and was calculated prior to the multi-dimensional integration. The integrated inhomogeneous line-function table was then interpolated using a spline method in the multi-dimensional integrations. All integrations were computed on the high performance computers at the Advanced Research Computing at Virginia Tech.

We first present the subtracted signal $$\frac{1}{E_0^2}S_\eta(\omega) \tag{21}$$

where $\eta$ can be either a $\pm\pi$ $$+\frac{\pi}{2}, \text{ or } -\frac{\pi}{2}.$$

Figure 3:
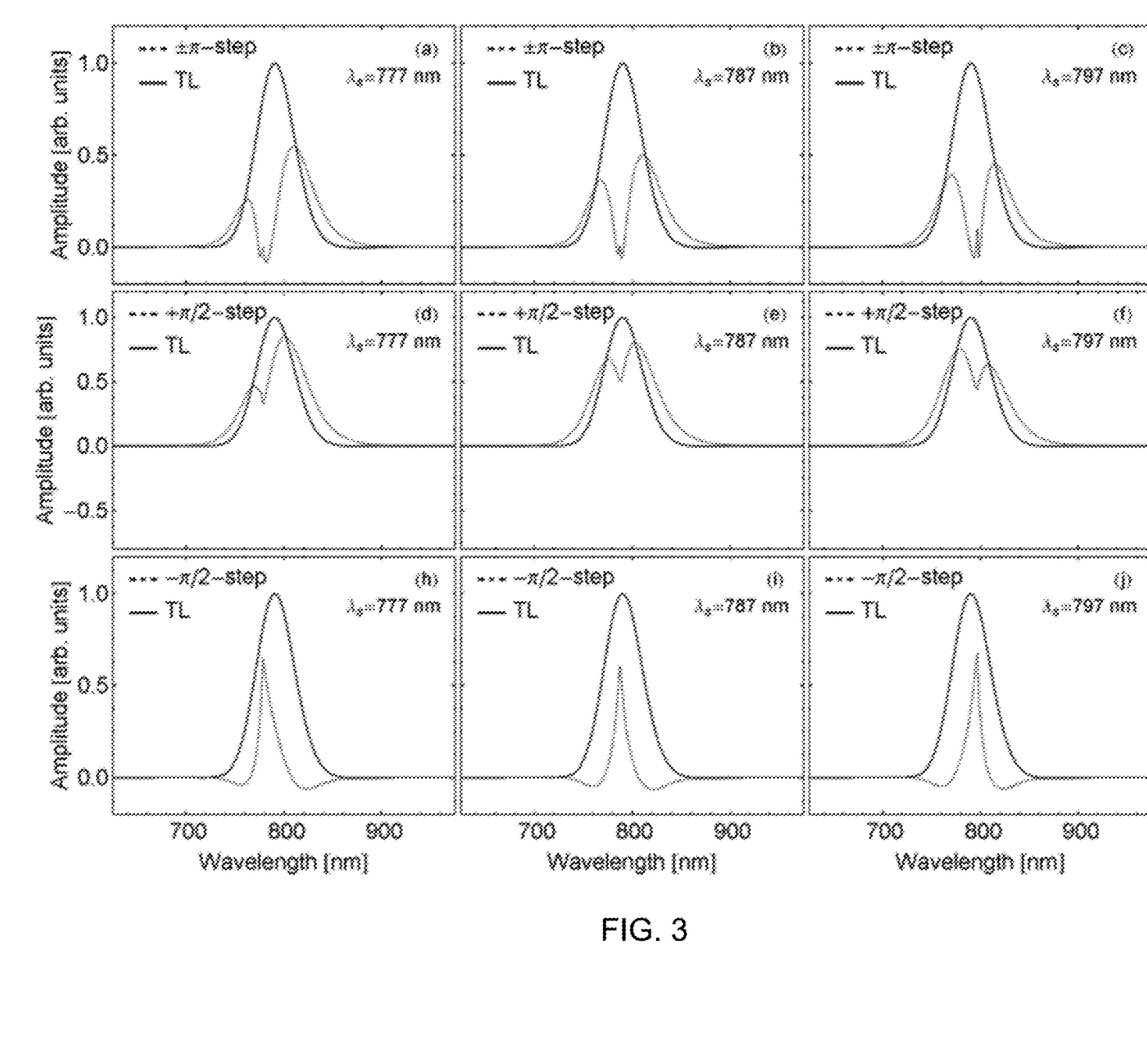
FIG. 3 is a set of graphs showing how the lineshape changes as the phase step traverses the absorption peak for three different values of the phase step as well as how the phase step can identify the location of an absorption maximum.

We do not neglect the $|P_\eta(\omega)|^2$ contribution to $S_\eta$ or $S_{TL}$. Equation 21 was made dimensionless $$\left(\frac{1}{E_0^2}\right)$$

and then normalized. Equation 21 is shown in FIG. 3(a-c) for and three different phase-step positions $\lambda_s=777, 787,$ and 797 nm and a $\pm\pi$-shaped pulse. The absorption signal, Eq. 21, for a TL pulse is also plotted as a reference. The polarization in Eq. 21 is the summation of the first and third-order polarizations, Eqs. 18 (19), B14 (B15) for a shaped (TL) pulse. FIG. 3(a) corresponds to the phase-step position below the absorption maximum, FIG. 3(c) above the absorption maximum, and FIG. 3(b) equal to the absorption maximum. As the phase-step crosses the absorption maximum, the sharp feature changes its lineshape from having an asymmetric tail to the right of the absorption maximum to being symmetric and having a tail to the left of the absorption maximum. This is an out-of resonant lineshape effect between the molecular electronic vibrational frequency and phase-step position. When the phase-step corresponds to the absorption maximum, the π-phase from the pulse compensates the phase change at the absorption maximum. What we mean by compensate is that a π-phase change from the pulse multiplies the π-phase change at the absorption maximum. In FIGS. 3(a-c), besides the sharp phase-step feature, there is part of signal that goes negative. We looked at the data and found that the negative contribution was from deconstructive interference occurring between $\text{Im}[E_{\pm\pi}P_{\pm\pi}]$ and $|P_{\pm\pi}|^2$. More specifically from the interference of the $P^{(1)}$ contribution to the signal, which is sensitive to the phase of the pulse. We chose a strong electric field and dipole moment. The signal Eq. 21 is plotted in FIG. 3(d-f) for a $$\frac{\pi}{2}$$

step shaped pulse. The sharp phase-step feature at 777 nm in FIG. 3(d) has an asymmetric lineshape that becomes more symmetric when the phase-step position coincides with the absorption maximum (787 nm) and then again asymmetric when the phase-step is at 797 nm. Comparing FIGS. 3(a-c) and (d-f), we see that (d-f) do not contain a negative absorption contribution.

The signal for a $$\frac{-\pi}{2}$$

step shaped pulse is shown in FIGS. 2(h-j). The only contribution to the signal in FIGS. 3(h-j) is the sharp feature that is either symmetric FIG. 3(i) or anti-symmetric FIG. 3(j). The lineshape in FIG. 3h, where the position of the phase-step corresponds to the absorption maximum is very symmetric. Comparing the ±π and $$\frac{\pm\pi}{2}$$

plots, the $$\frac{-\pi}{2}$$

has a on-resonant phase and gives the best lineshape indication of the absorption maximum.

Next, we present the separation of the real and imaginary parts. The imaginary part of the susceptibility, which is sensitive to the phase, can be separated by using Eq. 9. This entails detecting the spectrum while using a ±π-step and then using a TL shaped pulse and subtracting them, $$\frac{1}{E_0^2}(S_{TL}(\omega) - S_{\pm\pi}(\omega)). \tag{22}$$

Another method to isolate the imaginary part of the susceptibility is to use a complex shaped pulse, such as the $$\frac{\pi}{2}$$

step and Eq. 10, which reads $$\frac{1}{E_0^2}\left(S_{TL}(\omega) - \frac{1}{2}\left(S_{-\frac{\pi}{2}}(\omega) + S_{+\frac{\pi}{2}}(\omega)\right)\right), \tag{23}$$

Figure 4:
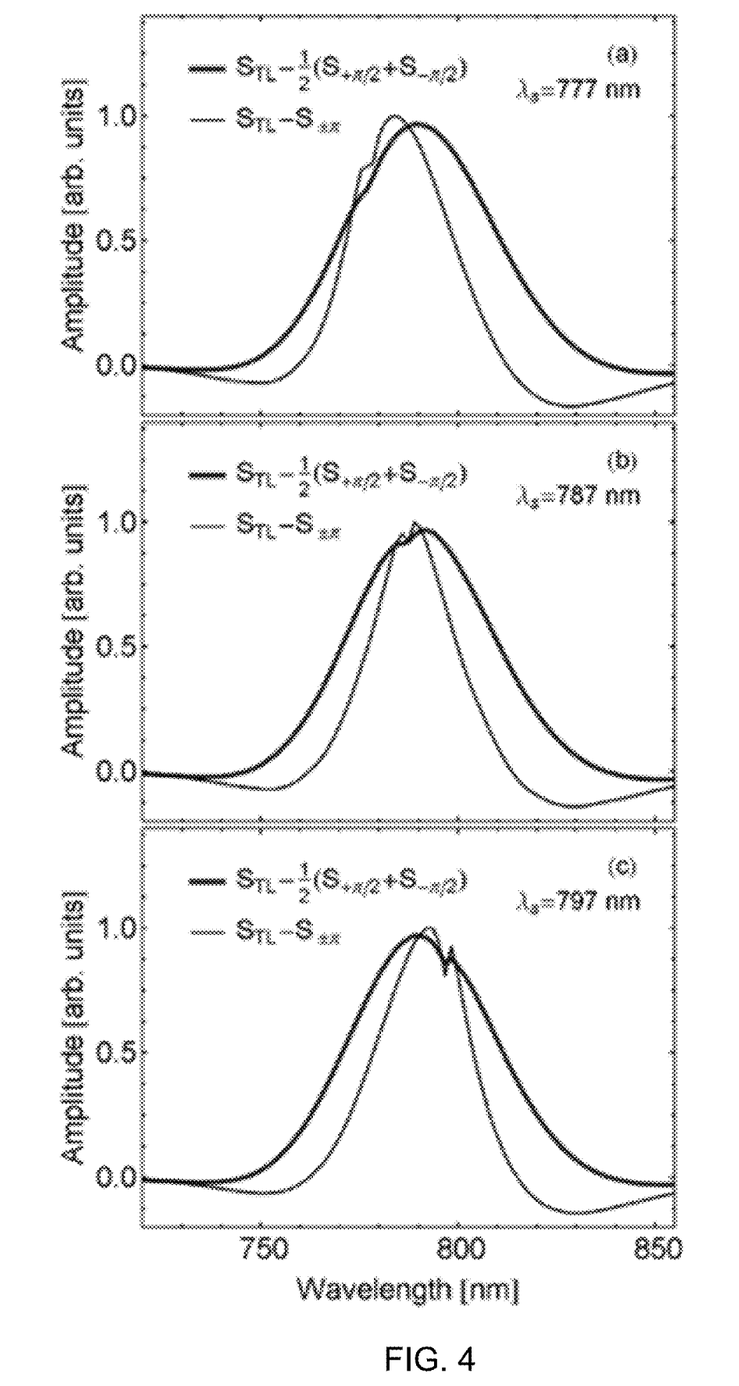
FIG. 4 is a graph of the imaginary part (absorption) of the third-order susceptibility measured using the methodology presented.

Equations 22, 23 are plotted in FIG. 4(a-c) for three different values of $\lambda_s$=777, 787, and 797 nm. Comparing Eqs. 22 and 23 plotted in FIG. 4, both have the same features. The absorption spectrum has a Gaussian shape as what is typically expected, with a sharp dip near the resonant phase-step function. Suggesting that less was absorbed around the phase-step transition (non-resonant phase). The sharp dip has the symmetric/asymmetric lineshape that we saw in FIG. 3. One might ask, if we see any features here related to dispersion in FIG. 4? The sharp feature FIG. 4 has an asymmetric lineshape that is sensitive to the position of the phase-step relative to the absorption maximum. Typically, the real part of the molecular polarization is sensitive to the change in sign from the absorption maximum; however, we see that the imaginary part shows sensitivity.

The real part of the susceptibility that is sensitive to the phase of the pulse can be found using Eq. 11 and a $$\frac{\pm\pi}{2}$$

step $$\frac{1}{E_0^2}\left(S_{-\frac{\pi}{2}}(\omega) - S_{+\frac{\pi}{2}}(\omega)\right). \tag{24}$$

Figure 5:
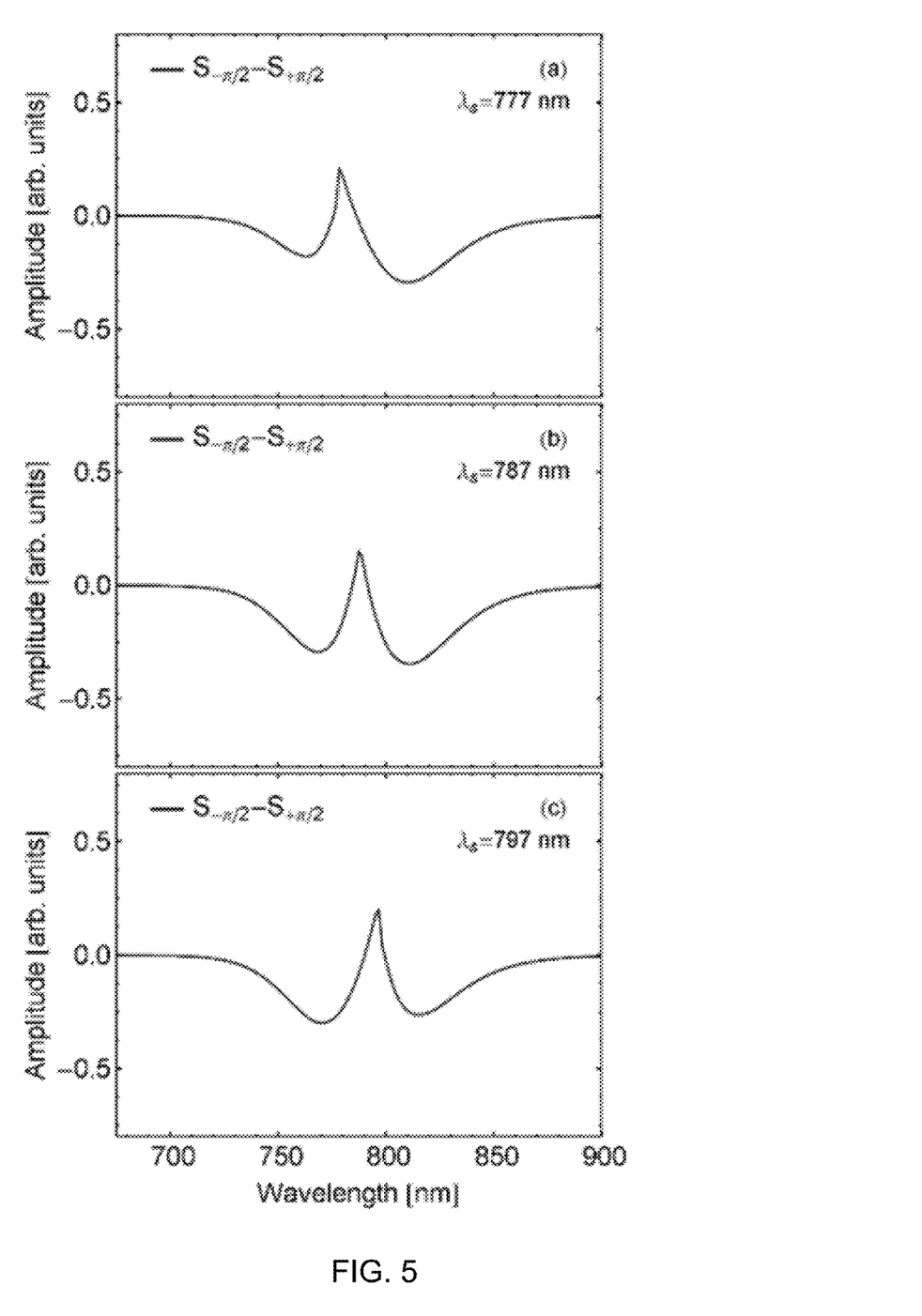
FIG. 5 is a graph of the real part (dispersion) of the third-order susceptibility measured using the methodology presented.

Equation 24 is plotted in FIG. 5(a-c). The dispersion contribution has a sharp peak near the phase-step position. The subtracted spectrum has an asymmetric lineshape to either side of the absorption maximum. The product of the phase-step and susceptibility flips the normal dispersion curve at the inflection point. In the next section we will show how this methodology relates to the molecular dynamics.

IV. CONNECTION TO PREVIOUS MODALITY (DETECT CONICAL INTERSECTIONS AND SOLUTE-SOLVENT INTERACTIONS)

Previous results using unshaped pulses demonstrated that the real and imaginary parts of the susceptibility have enabled us to understand complex molecular dynamics associated with molecular photo-isomerization. We showed in this manuscript how to measure the real and imaginary components of third-order polarization using a single shaped pulse. In this section, we have included two different simulations to connect our method of separating the real and imaginary parts to previous using unshaped pulses to identify conical intersections.

A conical intersection is known for its geometrical phase. It is defined as the point where two electronic POSs cross due to nuclear motion. The topology of the two crossing electronic POS is a double cone. When the wave packet transverses around a conical intersection, it acquires a geometric phase. More specifically, the wave packet acquires a π-phase-shift for a complete circulation or $$\pm \frac{\pi}{2}$$

for the wave-packet traversing by the conical intersection. When a shaped pulse with an applied phase π

$$\left(\pm \frac{\pi}{2}\right)$$

step, located at $\omega_s = \omega_k$, excites and creates a wave packet, the wave packet will acquire a π

$$\left(\pm \frac{\pi}{2}\right)$$

phase shift at $\omega_s = \omega_k$. As the wave packet propagates and encircles a conical intersection, it acquires another π-phase shift.

Figure 6:
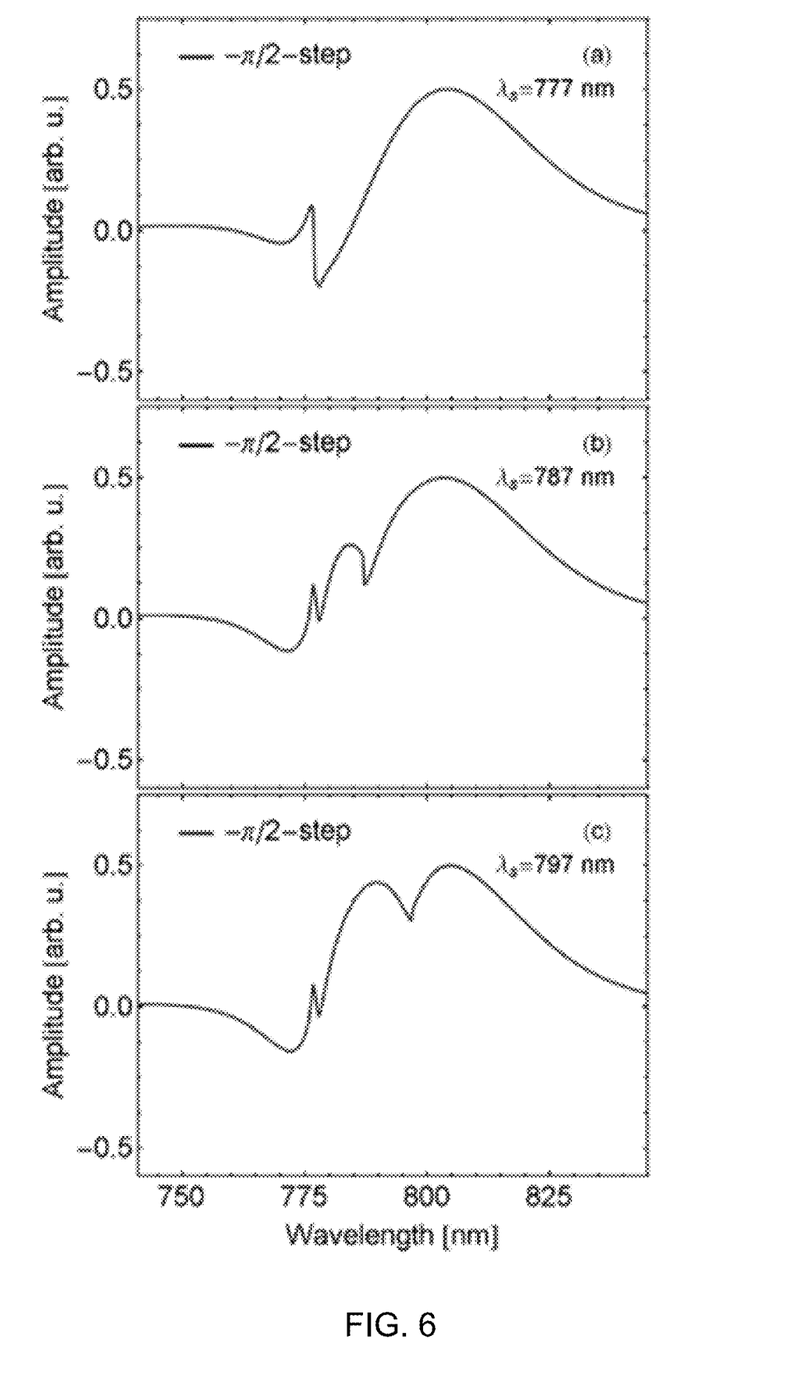
FIG. 6 is a graph of the subtracted spectrum showing how the lineshape changes as the phase step traverses a conical intersection with a geometric phase change of π-step.

To simulate the wave packet encountering a conical intersection we modified the Green's function in the double-sided Feynman diagrams. The Green's function $G_k(\omega)$ represents the propagation of the wave packet in the excited state potential energy surface. Calculations based on the Feynman diagrams reproduced major features observed in experiments with molecular isomerization without using shaped pulses. We represent the phase acquired by the wave packet intersecting the conical intersection as a sharp π-phase-step located at 1.59 eV. The sharp phase-step function in the Green's function has a transition frequency of $\tau_s = 2800$ GHz$^{-1}$ and includes the narrow Lorentzian Eq. 12. The modified Green's function $G_k(\omega)$ in Eqs. B3, B5-B8 and Eqs. B9-B13 (see Appendix B) is given by $$G_k(\omega) \rightarrow G_k(\omega) M_\pi(\omega), \quad (25)$$

where $M_\pi$ is given by Eq. 12 with $\lambda_s = 777$ nm. In FIG. 6c, we use a $$+\frac{\pi}{2}$$

a phase-step for three different phase-step positions. In FIG. 6c, the phase-step position at 797 nm does not coincide with the geometrical phase acquired at 777 nm from the conical intersection. There are two dips in FIG. 6c, one from the phase-step location at 797 nm and another at 777 nm from the simulated geometrical phase change from the wave packet encountering a conical intersection. In FIG. 6b, the phase-step position is changed to 787 nm. The line-shape of the phase-step dip at 787 nm becomes asymmetric. In FIG. 6a the phase-step location and simulation of the geometrical phase coincide (777 nm) and the phase from the electric field and conical intersection combine and change the lineshape to be asymmetric. It is the addition of a π (geometrical phase) and $$+\frac{\pi}{2}$$

(electric field)-phase.

Figure 7:
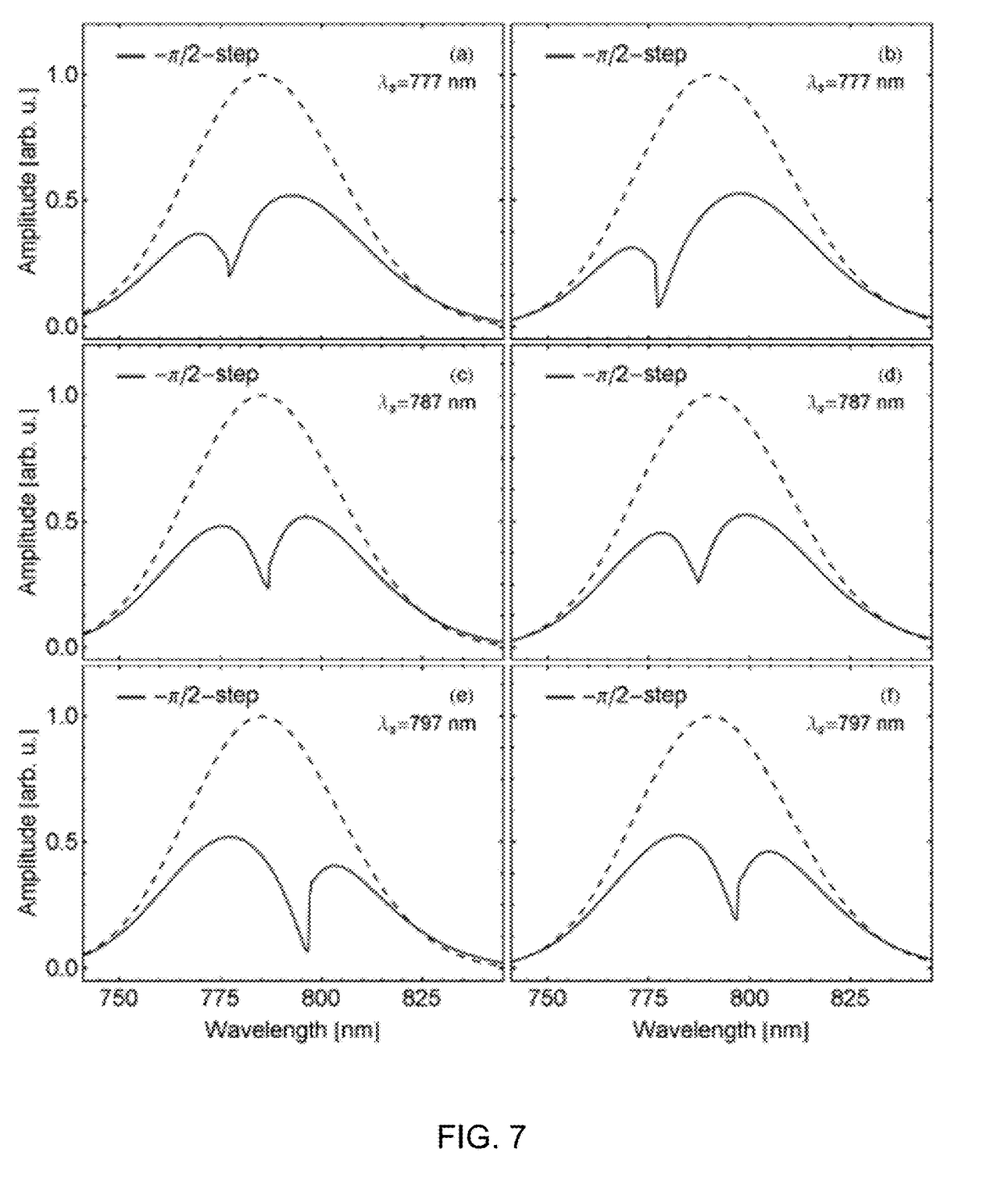
FIG. 7 is a graph of the subtracted spectrum showing how the lineshape changes as the phase step traverses an absorption maximum of a solvated molecule.

Next we would like test the ability to identify the location of the absorption maximum with the lineshape of the real part of the heterodyne detected signal for detecting a hot ground state with a solvated molecule with asymmetric lineshapes. Asymmetric lineshapes have been observed in polar, nonpolar, and non-interacting solvents. Symmetric and asymmetric have been observed in gases. Both symmetric and asymmetric lineshapes have been observed in the Raman spectroscopy of Stilbene. Here we use an asymmetric vibrational lineshape Eq. 20 for the two different values of the absorption maximum, at 785 nm and 790 nm in FIG. 7. An asymmetric decay rate, Eq. 23, was used in the Green's function $G_k$. Comparing FIG. 7(c,d), we see that when the absorption maximum changes from 790 nm (b,d,f) to 785 nm (a,c,e) that the lineshape changes from a symmetric like to asymmetric like. This demonstrates that the phase-step can detect the absorption maximum accurately.

V. EXPLORATION TO CONTROLLING CHEMICAL REACTIONS

Shortly after the invention of the laser, pulse shaping was considered an ideal tool for controlling chemical reactions, that is, formation of chemical bonds. Pulse-shaping was used as a method to enhance or suppress quantum pathways, through deconstructive/constructive interference of the wave packet transitioning between different states. The description of the molecule was represented as level scheme; the photo-isomerization of a molecule was represented as a two-dimensional potential line with one-to-two different pathways and the possibility of transitioning to other nearby POSs. The wave packet was interpreted as propagating down the potential energy surface near the conical intersection, where it transitioned to a different state. Eventually, the theoretical model progressed further and a three-dimensional model of the excited state POS was developed from quantum chemistry methods. The wave packet propagation in the 3D POS was modeled as a real Gaussian-like wave packet. To incorporate the shaped pulse creating the wave packet initially in the POS, theoretical models would have to use complex Gaussian wave packets and thus complex POSs. This has been a challenge, since the quantum chemistry calculations for a Real Gaussian wave packet with a real POSs are a challenge. However, these theories developed from a three-dimensional POS lead to descriptions that could be utilized to further our understanding to control chemical reactions. Researchers have employed genetic algorithms to find an optimal electric field phase to control the chemical reaction.

What is needed is a conceptual understanding of the wave packet propagation in the POS near the conical intersection and how the electric field creating the wave packet affects that propagation. We have developed theory explaining this for chirped pulses and it was demonstrated experimentally at the same time for homodyne detection. Here we expanded on that theory for the phase step with heterodyne detection and explain how the phase of the electric field changes the lineshape of the detected spectrum during isomerization.

The ideas presented in the present application can be used to develop an experimental modality to test and compare theoretical advances to control chemical reactions. To our knowledge, no one has yet developed an experimental method to map out all of the pathways of the wave packet and its' properties: 1) what is the momentum-dependent lifetime of the wave packet through a conical intersection; 2) how sharp is the curvature of the POS; 3) which electronic vibrational frequencies of the wave packet encircle, traversed by the, or did not encounter the conical intersection? We aim to answer these three questions to map out the excited state POS.

Figure 9:
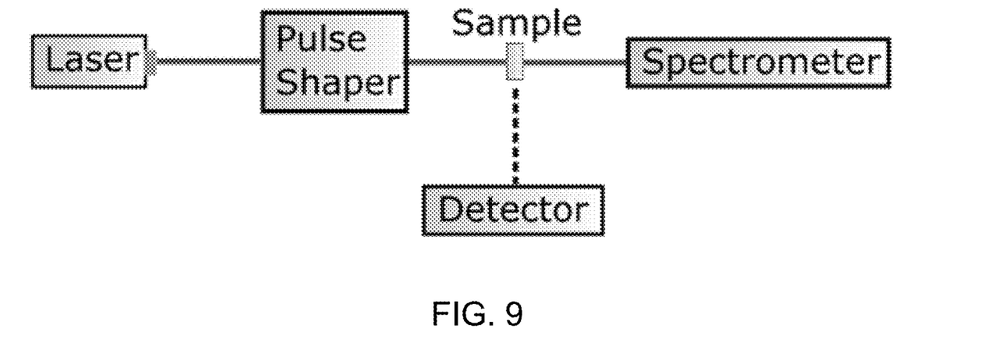
FIG. 9 is an illustration of the experimental setup in accordance with the method of the present application with the added ability to measure the fluorescence of a molecule.

A methodology that we propose to map out the excited state POS is based upon the work in this application. It can be very easily implemented, without using multiple pulses or using genetic algorithms. All that is needed is a laser, pulse shaper, spectrometer (heterodyne-detected), and detector (fluorescence). The experimental setup is shown in FIG. 9. Both the fluorescence and stimulated emission are detected simultaneously.

The solvated molecular fluorescence with a single chirped pulse was detected. The features in the signal were used to decode how steep the potential energy surface was, determine the momentum dependent lifetime of the wave packet though the conical intersection, and provide information about the pathways near the conical intersection.

The lifetime is described as being from the moment the wave packet is initiated and then propagates to the minimum of the POS. This includes the possibility of the wave packet encountering a conical intersection. There are three different pathways, near a conical intersection: encircling ($\pm\pi$), traversing by $$\left(\frac{+\pi}{2}\right),$$

or traversing by $$\left(-\frac{\pi}{2}\right).$$

If the wave packet encircles the conical intersection, either direction will create deconstructive interference, due to the geometric phase effect. If the wave packet traversed by the conical intersection $$\left(\frac{+\pi}{2}, -\frac{\pi}{2}\right)$$

to another minimum in the POS, or transitions to another state and goes to a minimum and fluoresces, no deconstructive interference occurs. We developed a theory that was experimentally demonstrated within the same group at the same time. We showed that the fluorescence decreases, when increasing the chirp rate for a state that has a wave packet encircling ($\pm\pi$) the conical intersection. This was not dependent upon the sign of the chirp. The momentum-dependent lifetime for the wave packet pathways that traversed $$\left(\frac{+\pi}{2}, -\frac{\pi}{2}\right)$$

to another minimum or transitioned to another state had a fluorescence that increased with increasing the chirp rate. This allowed us to identify the pathways that have deconstructive/constructive interference in the excited state POS.

The steepness of the potential energy surface can be determined by analyzing the chirp rate vs. the fluorescence yield for a positive vs. negative chirp rate. A sharp potential energy surface will have asymmetry for a positive vs. negative chirp rate; whereas, a moderately changing potential energy surface will be symmetric for a positive vs. negative chirp rate.

It is natural to ask how the method developed in this application can be used experimentally and how an experimentalist can utilize these results to further their understanding of conical intersections. Here we used a single shaped pulse (phase-step) and detected the spectrum in the forward direction (heterodyne detection). We simulated the change in the lineshape, when the $$-\frac{\pi}{2}$$

phase-step position coincided/did not coincide with the conical intersection.

We suggest extending FIG. 6 for all three phase-step types $$\left(\pm\pi, \frac{+\pi}{2}, -\frac{\pi}{2}\right)$$

to a generate a two-dimensional spectrum of the molecular absorption vs. the phase-step position to reveal which vibrational frequencies inherit a $\pm\pi$ or $$\pm\frac{\pi}{2}$$

geometrical phase when a wave packet transverses encircles the conical intersection or by the conical intersection. The dramatic change in lineshape at a particular $\omega_s$, due to the cancellation of the phase as the vibrational energy $\omega_s$ crosses a conical intersection, would be the smoking gun to identify the conical intersection in the spectrum. The change in the lineshape is most noticeable when plotting the subtracted signals, Eqs. 22-24.

We also suggest doing a two-dimensional spectrum vs. the phase-step position for various types of solutes (polar/nonpolar, viscous/non-viscous) to reveal a more in-depth understanding of the asymmetric lineshape and isomerization. Changing the solvent viscosity can slow down the molecular isomerization process and decrease the product yield. This can in turn tell an experimentalist if the observed change in a two-dimensional plot of the phase-step position vs. spectrum is indeed associated with the geometrical phase change due to the conical intersection.

It is understood that if the experimentalist uses identically shaped pulses and varies the time-delay between them; then, time could be incorporated into the experimental measurements Direct correlation between the electric field phase and wave packet was demonstrated experimentally using two delayed pulses and detecting the fluorescence from a single molecule. The detected signal showed a $\pi$-phase difference when the two pulses where out of phase vs. in phase. We showed that a chirped pulse can directly change the angular momentum of the wave packet in the excited stated potential energy surface and be used to control molecular photo-isomerization through deconstructive/constructive interference. Here we expanded that modality to include measuring the real and imaginary parts of the nonlinear susceptibility.

VI. CONCLUSION

The current application has many advantages over the prior art including at least the following points. Simulation of molecular isomerization using shaped pulses and quantum chemistry calculations would require employing a wave packet that has both real and imaginary parts. We are unaware of any quantum chemistry code available to accurately calculate the isomerization process with including both propagation on the ground and excited state potential energy surfaces and considering a complex wave packet. Here, we carefully selected a very good example to demonstrate the quantitative ability of the theory to detect a geometrical phase change of an intrinsic property of the molecule: The peak in the absorption maximum and the geometrical phase acquired as the wave packet encircles the conical intersection. We showed how the phase-step can be used to detect the conical intersection location in the spectrum. When a molecule isomerizes, the peak in the absorption maximum shifts. A hot ground state is a good example of this. When a molecule is changed to a higher viscosity solvent, the peak in the absorption maximum changes. We demonstrated that our theory can detect the location of the absorption maximum. We extended this idea qualitatively to detect the geometrical phase change acquired at the conical intersection. We also introduced a conceptual idea of choosing a particular parameter of the phase-function to be in resonance with the electronic absorption line.

The particular points and concepts disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

Additional information is contained below in assorted Appendices.

Appendix A: $\Phi_1$ and $\Phi_2$ in Eq. 7

The expressions for $\Phi_1$ and $\Phi_2$ in Eq. 7 are given by $$\Phi_1^{\pm\phi}(\omega, \omega_1, \omega_2) = \quad (A1)$$
$$-\text{Im}[M(\omega)]\text{Im}[M(\omega)]\text{Im}[M(\omega)]\text{Im}[M(\omega - \omega_1 + \omega_2)] +$$
$$\text{Re}[M(\omega)]\text{Re}[M(\omega)]\text{Im}[M(\omega_2)]\text{Im}[M(\omega - \omega_1 + \omega_2)] -$$
$$\text{Re}[M(\omega)]\text{Im}[M(\omega_1)]\text{Re}[M(\omega_2)]\text{Im}[M(\omega - \omega_1 + \omega_2)] +$$
$$\text{Re}[M(\omega)]\text{Im}[M(\omega_1)]\text{Im}[M(\omega_2)]\text{Re}[M(\omega - \omega_1 + \omega_2)] +$$
$$\text{Im}[M(\omega)]\text{Re}[M(\omega_1)]\text{Re}[M(\omega_2)]\text{Im}[M(\omega - \omega_1 + \omega_2)] -$$
$$\text{Im}[M(\omega)]\text{Re}[M(\omega_1)]\text{Im}[M(\omega_2)]\text{Re}[M(\omega - \omega_1 + \omega_2)] +$$
$$\text{Im}[M(\omega)]\text{Im}[M(\omega_1)]\text{Re}[M(\omega_2)]\text{Re}[M(\omega - \omega_1 + \omega_2)] -$$
$$\text{Re}[M(\omega)]\text{Re}[M(\omega_1)]\text{Re}[M(\omega_2)]\text{Im}[M(\omega - \omega_1 + \omega_2)]$$

and $$\Phi_2^{\pm\phi}(\omega, \omega_1, \omega_2) = \quad (A2)$$
$$-\text{Re}[M(\omega)]\text{Im}[M(\omega)]\text{Im}[M(\omega)]\text{Im}[M(\omega - \omega_1 + \omega_2)] +$$
$$\text{Im}[M(\omega)]\text{Re}[M(\omega_1)]\text{Im}[M(\omega_2)]\text{Im}[M(\omega - \omega_1 + \omega_2)] -$$
$$\text{Im}[M(\omega)]\text{Im}[M(\omega_1)]\text{Re}[M(\omega_2)]\text{Im}[M(\omega - \omega_1 + \omega_2)] +$$
$$\text{Im}[M(\omega)]\text{Im}[M(\omega_1)]\text{Im}[M(\omega_2)]\text{Re}[M(\omega - \omega_1 + \omega_2)] +$$
$$\text{Im}[M(\omega)]\text{Re}[M(\omega_1)]\text{Re}[M(\omega_2)]\text{Re}[M(\omega - \omega_1 + \omega_2)] -$$
$$\text{Re}[M(\omega)]\text{Im}[M(\omega_1)]\text{Re}[M(\omega_2)]\text{Re}[M(\omega - \omega_1 + \omega_2)] +$$
$$\text{Re}[M(\omega)]\text{Re}[M(\omega_1)]\text{Im}[M(\omega_2)]\text{Re}[M(\omega - \omega_1 + \omega_2)] -$$
$$\text{Re}[M(\omega)]\text{Re}[M(\omega_1)]\text{Re}[M(\omega_2)]\text{Im}[M(\omega - \omega_1 + \omega_2)],$$

where every $M(\omega)$ term in equations A1 and A2 should have the subscript $\pm\phi$, which we left out in these expressions for ease of reading. Equations (A1, A2) were found by expanding the product of the electric field phase components in the integrand of the third-order polarization.

Figure 8:
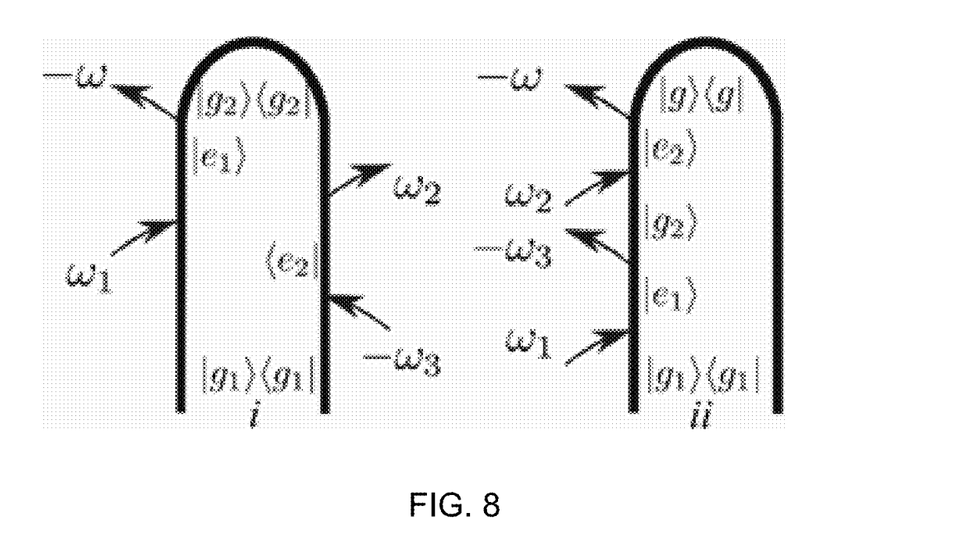
FIG. 8 is a figure of the loop diagrams used to calculate the third-order susceptibility for a ground state energy band $g_1$ and an excited state energy band $e_1$.

Appendix B: Inhomogeneous Broadening of the Third-Order Polarization with a Resonant Phase Step The loop diagrams form the third-order nonlinear polarization expressions to excite a two-level system are shown in FIG. 8. The first electronic state has vibration levels k, and will have the susceptibilities $\chi_i^{(3)}$ and $\chi_{ii}^{(3)}$, which read $$\chi_i^{(3)}(\omega, \omega_1, \omega_2) = \left(\frac{-1}{2\pi\hbar}\right)^3 \sum_{kk'} |\mu_{k'}|^2 |\mu_k|^2 \times G_{k'}^\dagger(\omega_2) G_g^\dagger(\omega_1 - \omega) G_k(\omega_2) \quad (B1)$$

and $$\chi_{ii}^{(3)}(\omega, \omega_1, \omega_2) = \left(\frac{-1}{2\pi\hbar}\right)^3 \sum_{kk'} |\mu_{k'}|^2 |\mu_k|^2 \times G_{k'}(\omega) G_g(\omega_1 - \omega_2) G_k(\omega_1). \quad (B2)$$

The summation over k and k' in Eqs. B1 and B2 includes the possibility of k⇔k'. The inhomogeneous broadening of $P_{k(i)}^{(3)}(\omega)$ will have five different contributions. The first is when $\omega_s = \omega_k$, and reads $$\langle P_{s=k(i)}^{(3)}(\omega)\rangle = \quad (B3)$$
$$\left(\frac{-1}{2\pi\hbar}\right)^3 |\mu_{k'}|^2 |\mu_k|^2 \int d\omega_1 d\omega_2 A(\omega_1) \times A^*(\omega_2) A(\omega - \omega_1 + \omega_2)$$
$$G_g^\dagger(\omega_1 - \omega) \int d\omega_k \mathcal{G}(\omega_k) \times M_{\pm\phi}^*(\omega; \omega_k) M_{\pm\phi}(\omega - \omega_1 + \omega_2; \omega_k)$$
$$M_{\pm\phi}(\omega_1; \omega_k) G_k(\omega_1) \times \int d\omega_{k'} \mathcal{G}(\omega_{k'}) G_{k'}^\dagger(\omega_2),$$

where $G_\eta(\omega)$ is the equilibrium Green's function for the state $\eta$ $$G_\eta(\omega) = \frac{1}{\hbar} \frac{1}{\omega - \omega_\eta + i\gamma_\eta}. \quad (B4)$$

$\omega_\eta$ is the vibrational frequency and $\gamma_\eta$ the decay rate. The second contribution is when $\omega_s = \omega_{k'}$ and reads $$\langle P_{s=k'(i)}^{(3)}(\omega)\rangle = \quad (B5)$$

$$\left(\frac{-1}{2\pi\hbar}\right)^3 |\mu_{k'}|^2 |\mu_k|^2 \int d\omega_1 d\omega_2 A(\omega_1) \times A^*(\omega_2) A(\omega - \omega_1 + \omega_2)$$

$$G_g^\dagger(\omega_1 - \omega) \int d\omega_k \mathcal{G}(\omega_k) \times M_{\pm\phi}^*(\omega; \omega_k) M_{\pm\phi}(\omega - \omega_1 + \omega_2; \omega_k)$$

$$M_{\pm\phi}(\omega_1; \omega_k) G_k^\dagger(\omega_2) \times \int d\omega_{k'} \mathcal{G}(\omega_{k'}) G_{k'}(\omega_1),$$

Third contribution, $\omega_s = \omega_k = \omega_{k'}$ is given by $$\langle P_{s=k=k'(i)}^{(3)}(\omega) \rangle = \quad (B6)$$

$$\left(\frac{-1}{2\pi\hbar}\right)^3 |\mu_k|^4 \int d\omega_1 d\omega_2 A(\omega_1) \times A^*(\omega_2) A(\omega - \omega_1 + \omega_2)$$

$$G_g^\dagger(\omega_1 - \omega) \int d\omega_k \mathcal{G}(\omega_k) \times M_{\pm\phi}^*(\omega_2; \omega_k)$$

$$M_{\pm\phi}(\omega - \omega_1 + \omega_2; \omega_k) M_{\pm\phi}(\omega_1; \omega_k) \times G_k^\dagger(\omega_2) G_k(\omega_1).$$

The last two are when the phase-step is not in resonance with the vibrational level k or k'. This is when $\omega_s \neq \omega_{k'}$, $\omega_s \neq \omega_k$, and $\omega_k = \omega_{k'}$ which reads $$\langle P_{s\neq k=k'(i)}^{(3)}(\omega) \rangle = \quad (B7)$$

$$\left(\frac{-1}{2\pi\hbar}\right)^3 |\mu_k|^4 \int d\omega_1 d\omega_2 A(\omega_1) \times A^*(\omega_2) A(\omega - \omega_1 + \omega_2)$$

$$M_{\pm\phi}(\omega - \omega_1 + \omega_2; \omega_s) \times M_{\pm\phi}^*(\omega_2; \omega_s) M_{\pm\phi}(\omega_1; \omega_s)$$

$$G_g^\dagger(\omega_1 - \omega) \int d\omega_k \mathcal{G}(\omega_k) \times G_k^\dagger(\omega_2) G_k(\omega_1).$$

The last expressions is when $\omega_k \neq \omega_{k'}$ and $\omega_s \neq \omega_k$ which reads $$\langle P_{s\neq k\neq k'(i)}^{(3)}(\omega) \rangle = \quad (B8)$$

$$\left(\frac{-1}{2\pi\hbar}\right)^3 |\mu_k|^2 |\mu_{k'}|^2 \int d\omega_1 d\omega_2 A(\omega_1) \times A^*(\omega_2) A(\omega - \omega_1 + \omega_2)$$

$$M_{\pm\phi}(\omega - \omega_1 + \omega_2; \omega_s) \times M_{\pm\phi}^*(\omega_2; \omega_s) M_{\pm\phi}(\omega_1; \omega_s)$$

$$G_g^\dagger(\omega_1 - \omega) \times \int d\omega_k d\omega_{k'} \mathcal{G}(\omega_k) \mathcal{G}(\omega_{k'}) G_k^\dagger(\omega_2) G_{k'}(\omega_1).$$

The inhomogeneous broadening of $P_{(iii)}^{(3)}$, which is related to $\chi_{iii}^{(3)}$ in Eq. B2, will have five contributions. The first is for $\omega_s = \omega_k \neq \omega_{k'}$ and is given by $$\langle P_{s=k=k'(i)}^{(3)}(\omega) \rangle = \quad (B9)$$

$$\left(\frac{-1}{2\pi\hbar}\right)^3 |\mu_k|^2 |\mu_{k'}|^2 \int d\omega_1 d\omega_2 A(\omega_1) A^*(\omega_2) A(\omega - \omega_1 + \omega_2)$$

$$G_g(\omega_1 - \omega_2) \int d\omega_k \mathcal{G}(\omega_k) M_{\pm\phi}^*(\omega_2; \omega_k) M_{\pm\phi}(\omega - \omega_1 + \omega_2; \omega_k)$$

$$M_{\pm\phi}(\omega_1; \omega_k) G_k(\omega_1) \int d\omega_{k'} \mathcal{G}(\omega_{k'}) G_{k'}(\omega).$$

The second contribution corresponds to $\omega_s = \omega_{k'} \neq \omega_k$ and is given by $$\langle P_{s=k'(ii)}^{(3)}(\omega) \rangle = \left(\frac{-1}{2\pi\hbar}\right)^3 |\mu_k|^2 |\mu_{k'}|^2 \quad (B10)$$

$$\int d\omega_1 d\omega_2 A(\omega_1) A^*(\omega_2) A(\omega - \omega_1 + \omega_2) G_g(\omega_1 - \omega_2)$$

$$\int d\omega_{k'} \mathcal{G}(\omega_{k'}) M_{\pm\phi}^*(\omega_2; \omega_{k'}) M_{\pm\phi}(\omega - \omega_1 + \omega_2; \omega_{k'})$$

$$M_{\pm\phi}(\omega_1; \omega_{k'}) G_{k'}(\omega) \int d\omega_k \mathcal{G}(\omega_k) G_k(\omega_1)$$

and the third contribution is when $\omega_s = \omega_k = \omega_{k'}$ and reads $$\langle P_{s=k'=k(iii)}^{(3)}(\omega) \rangle = \quad (B11)$$

$$\left(\frac{-1}{2\pi\hbar}\right)^3 |\mu_k|^4 \int d\omega_1 d\omega_2 A(\omega_1) A^*(\omega_2) A(\omega - \omega_1 + \omega_2)$$

$$G_g(\omega_1 - \omega_2) \int d\omega_k \mathcal{G}(\omega_k) M_{\pm\phi}^*(\omega_2; \omega_k)$$

$$M_{\pm\phi}(\omega - \omega_1 + \omega_2; \omega_k) M_{\pm\phi}(\omega_1; \omega_k) G_k(\omega) G_k(\omega_1).$$

There are two other contributions when the phase-step is not in resonance with the vibrational line. The first being $\omega_s \neq \omega_k = \omega_k$ $$\langle P_{s\neq k=k'(ii)}^{(3)}(\omega) \rangle = \quad (B12)$$

$$\left(\frac{-1}{2\pi\hbar}\right)^3 |\mu_k|^4 \int d\omega_1 d\omega_2 A(\omega_1) A^*(\omega_2) A(\omega - \omega_1 + \omega_2)$$

$$M_{\pm\phi}(\omega - \omega_1 + \omega_2; \omega_s) M_{\pm\phi}(\omega_1; \omega_s) M_{\pm\phi}^*(\omega_2; \omega_s)$$

$$G_g(\omega_1 - \omega_2) \int d\omega_k \mathcal{G}(\omega_k) G_k(\omega) G_k(\omega_1)$$

And the second one $\omega_s \neq \omega_k \neq \omega_k$ and $\omega_s \neq \omega_k$ reads $$\langle P_{s\neq k\neq k'(ii)}^{(3)}(\omega) \rangle = \quad (B13)$$

$$\left(\frac{-1}{2\pi\hbar}\right)^3 |\mu_k|^2 |\mu_{k'}|^2 \int d\omega_1 d\omega_2 A(\omega_1) A^*(\omega_2) A(\omega - \omega_1 + \omega_2)$$

$$M_{\pm\phi}(\omega - \omega_1 + \omega_2; \omega_s) M_{\pm\phi}(\omega_1; \omega_s) M_{\pm\phi}^*(\omega_2; \omega_s)$$

$$G_{g1}(\omega_1 - \omega_2) \int d\omega_{k'} \omega_k \mathcal{G}(\omega_{k'}) \mathcal{G}(\omega_k) G_k(\omega) G_{k'}(\omega_1).$$

Using Eqs. B3, B5-B13, the detected third-order polarization generated with a shaped pulse is given as $$\langle P_\phi^{(3)}(\omega) \rangle = \quad (B14)$$

$$\frac{1}{5} \big( \langle P_{s=k(i)}^{(3)}(\omega) \rangle + \langle P_{s=k'(i)}^{(3)}(\omega) \rangle + \langle P_{s=k=k'(i)}^{(3)}(\omega) \rangle + \langle P_{s\neq k=k'(i)}^{(3)}(\omega) \rangle +$$

$$\langle P_{s\neq k\neq k'(i)}^{(3)}(\omega) \rangle + \langle P_{s=k(ii)}^{(3)}(\omega) \rangle + \langle P_{s=k'(ii)}^{(3)}(\omega) \rangle +$$

$$\langle P_{s=k=k'(iii)}^{(3)}(\omega) \rangle + \langle P_{s\neq k=k'(ii)}^{(3)}(\omega) \rangle + \langle P_{s\neq k\neq k'(ii)}^{(3)}(\omega) \rangle \big)$$

and for a TL pulse, the nonlinear polarization is given as $$\langle P_{TL}^{(3)}(\omega) \rangle = \frac{1}{2} \big( \langle P_{s=k=k'(i)}^{(3)}(\omega) \rangle + \langle = P_{s=k=k'}^{(3)}(\omega) \rangle +$$

$$\langle P_{s=k=k'(ii)}^{(3)}(\omega) \rangle + \langle P_{s=k=k'(ii)}^{(3)}(\omega) \rangle \big) \quad (B15)$$

with setting $M(\omega)=1$ in Eqs. B8-B13. The factor of ⅕ or ½ was added to scale the probability distribution properly. Equation B14 models the nonlinear lineshape with a resonant phase.

What is claimed is:

1. A method of detecting a geometrical phase change of an intrinsic property of a molecule, comprising:
    assigning a phase function to obtain separation of the real and imaginary parts;
    measuring a stimulated emission and fluorescence of the molecule using a reference field;
    measuring the stimulated emission and the fluorescence of the molecule using the phase function on the reference field;
    measuring the stimulated emission and the fluorescence using a negative of the phase function on the reference field;
    combining the measurements of the real and imaginary parts with the stimulated emission and the fluorescence so as to detect a conical intersection by:
        separating the real and imaginary parts of a non-linear susceptibility in a detected heterodyne molecular signal by controlling a phase of the reference field;
    identifying the conical intersection by:
        looking at a change in a detected lineshape in the heterodyne signal;
    using a chirped pulse to detect an amount of fluorescence with the phase of the reference field from the step of combining the measurements; and
    simulating molecular isomerization of the molecule through application of a single shaped pulse to generate a molecular polarization.

2. The method of claim 1, wherein the phase function is a sharp phase-step.

3. The method of claim 1, wherein the phase function is a chirped pulse.

4. The method of claim 1, wherein separation of the of the real and imaginary parts occurs in third-order non-linear susceptibility.

5. The method of claim 1, wherein separation of the real and imaginary occurs by measuring the molecular signal in a forward direction with a single shaped pulse.

6. The method of claim 5, further comprising:
    measuring the molecular signal with a TL pulse and subtracting such from molecular signal in the forward direction.

7. The method of claim 6, wherein separation of the of the real and imaginary parts occurs in third-order non-linear susceptibility.

8. The method of claim 1, wherein the assigned phase function is a $\pm\pi$ phase-step.

9. The method of claim 1, wherein the assigned phase function is a $\pm\pi/2$ phase-step.

10. The method of claim 1, wherein the assigned phase function is transform limited.

11. The method of claim 1, wherein the phase function is a spectral phase function to resonantly induce excitement in a particular vibrational line as the phase-step coincides with a vibrational resonance.

12. The method of claim 11, wherein the phase-step creates a change in the electric field.

13. The method of claim 1, wherein a sharp phase-step creates a change in an electric field at a phase-step transition frequency, thereby creating an instantaneous field change from a positive to negative value.

14. The method of claim 1, further comprising:
    detecting a location of an absorption maximum.

15. The method of claim 1, wherein the phase-function is in-resonance with an electronic absorption line.

16. The method of claim 1, wherein the phase-step is used to detect the conical intersection location in a spectrum.

17. The method of claim 1, further comprising:
    detecting a hot ground state by a shifting an absorption maximum.

18. The method of claim 1, wherein detection of the fluorescence is by homodyne detection.

19. The method of claim 1, wherein a use of various solvent viscosities to assist in the identification of the location of a conical intersection.

20. The method of claim 1, wherein a use of a sharp phase-step and chirped pulse to identify pathways in of a wavepacket in an excited state potential energy surface.

* * * * *